Figure 1:
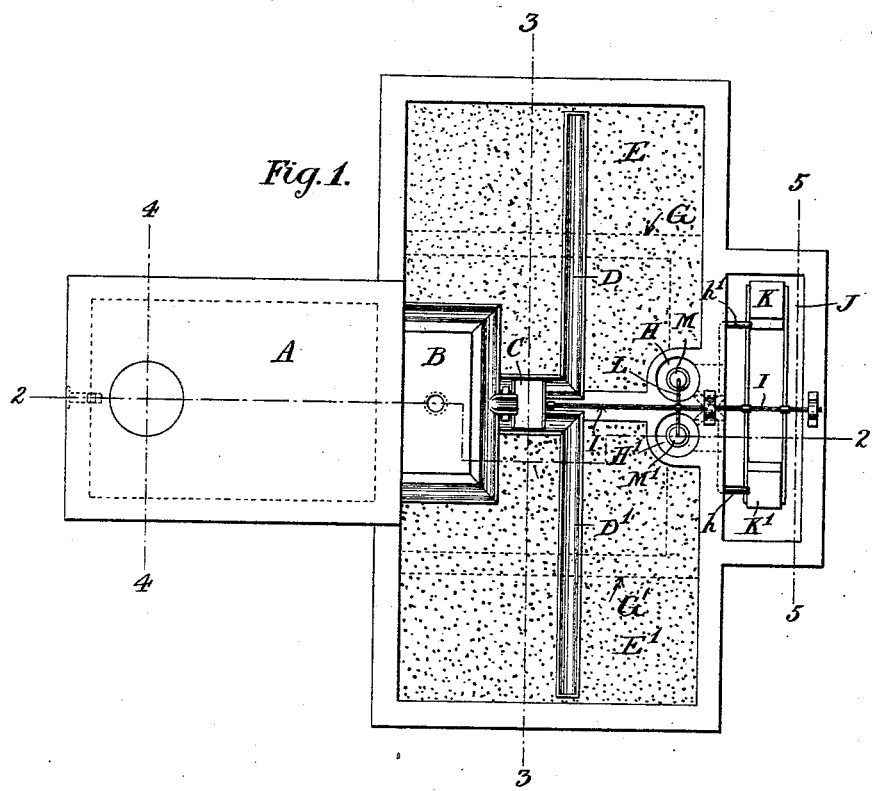

No. 634,424. Patented Oct. 3, 1899.
D. CAMERON & F. J. COMMIN.
APPARATUS FOR AUTOMATICALLY DELIVERING LIQUIDS TO RECEPTACLES.
(Application filed Mar. 15, 1897.)
(No Model.) 10 Sheets—Sheet 1.

Witnesses:
S. M. Dorsett,
Inventors,
D. Cameron,
F. J. Commin,
By F. C. Somes
Attorney No. 634,424. Patented Oct. 3, 1899.
D. CAMERON & F. J. COMMIN.
APPARATUS FOR AUTOMATICALLY DELIVERING LIQUIDS TO RECEPTACLES.
(Application filed Mar. 15, 1897.)
(No Model.) 10 Sheets—Sheet 2.
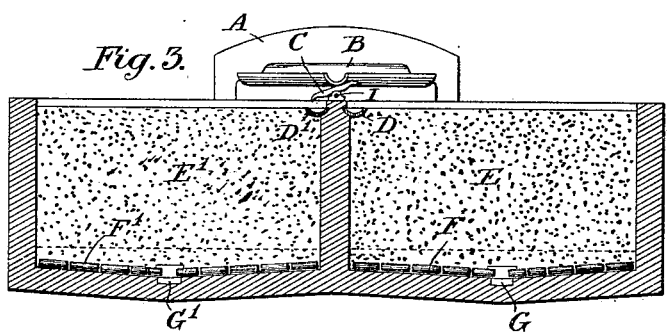
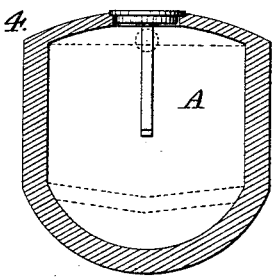
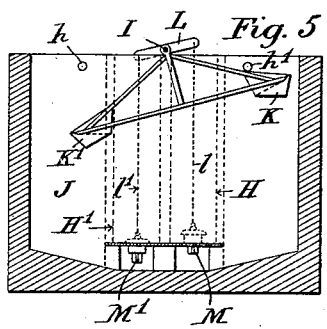
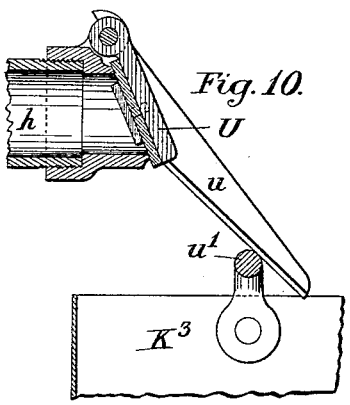
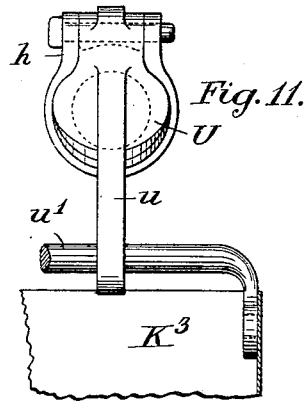

No. 634,424. Patented Oct. 3, 1899.
D. CAMERON & F. J. COMMIN.
APPARATUS FOR AUTOMATICALLY DELIVERING LIQUIDS TO RECEPTACLES.
(Application filed Mar. 15, 1897.)
(No Model.) 10 Sheets—Sheet 3.
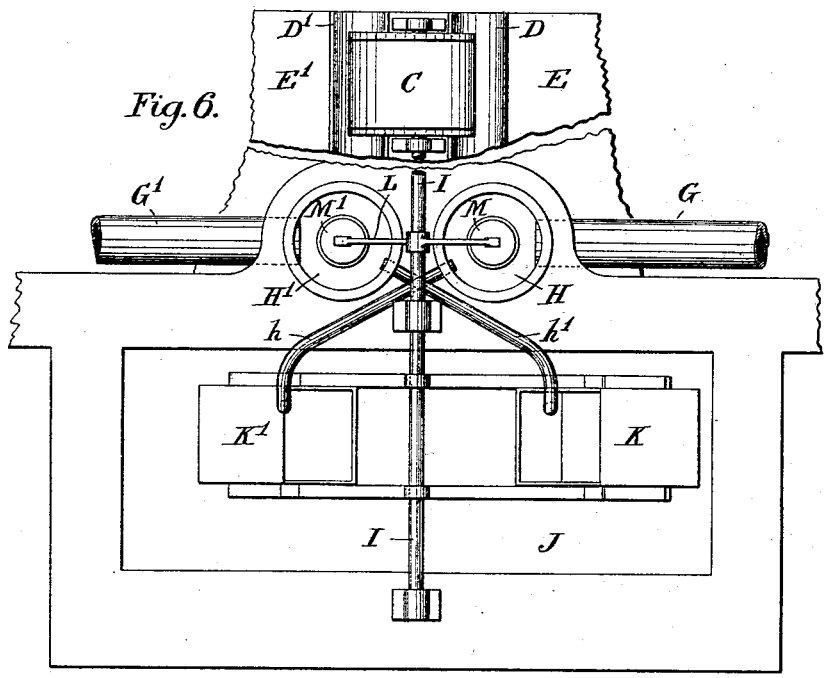
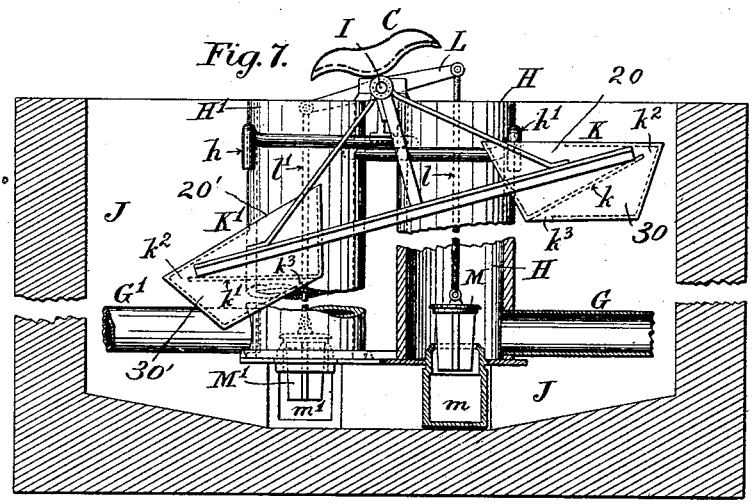

No. 634,424. Patented Oct. 3, 1899.
D. CAMERON & F. J. COMMIN.
APPARATUS FOR AUTOMATICALLY DELIVERING LIQUIDS TO RECEPTACLES.
(Application filed Mar. 15, 1897.)
(No Model.) 10 Sheets—Sheet 4.
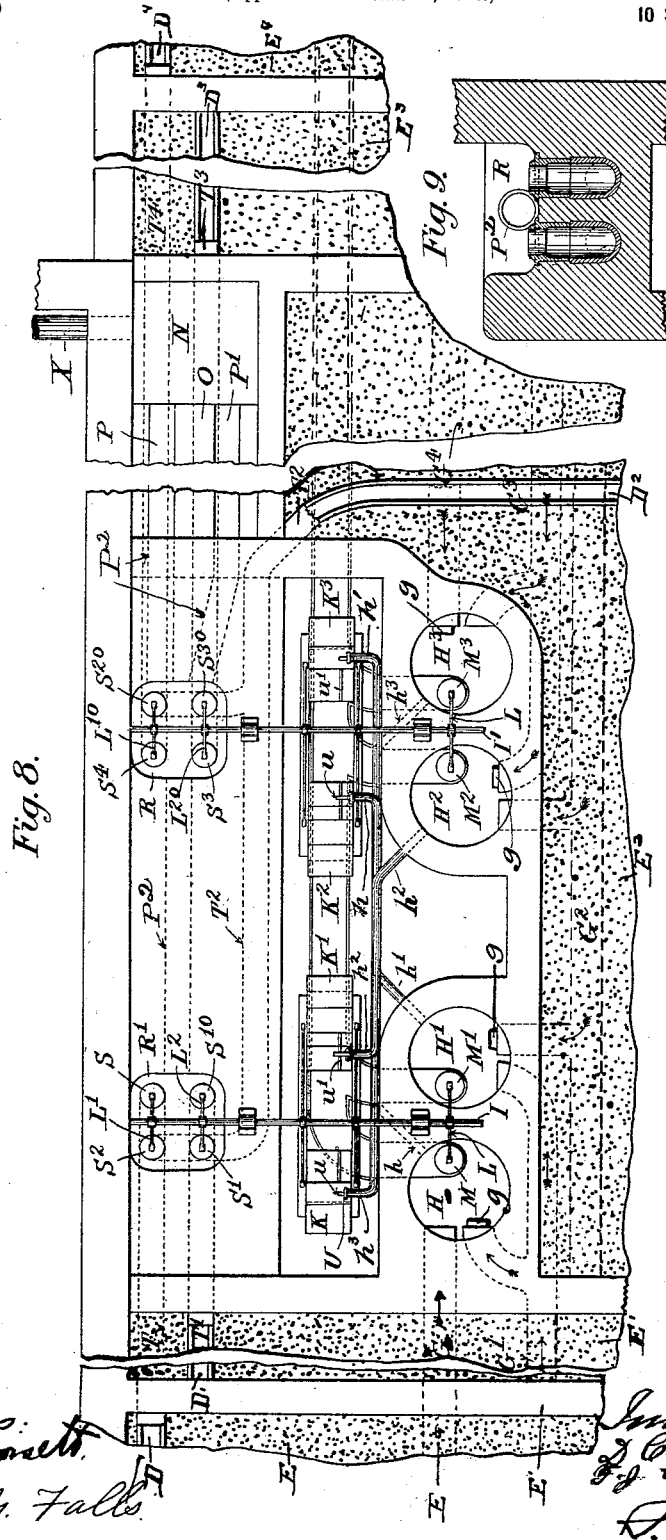

No. 634,424. Patented Oct. 3, 1899.
D. CAMERON & F. J. COMMIN.
APPARATUS FOR AUTOMATICALLY DELIVERING LIQUIDS TO RECEPTACLES.
(Application filed Mar. 15, 1897.)
(No Model.) 10 Sheets—Sheet 5.
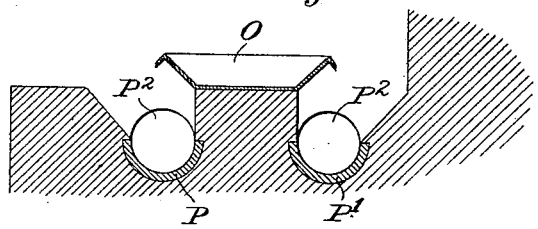
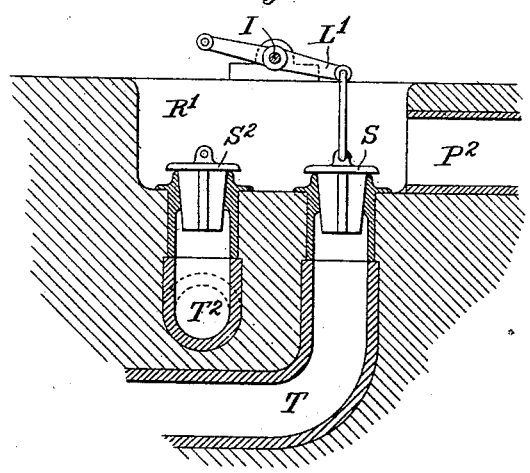

No. 634,424. Patented Oct. 3, 1899.
D. CAMERON & F. J. COMMIN.
APPARATUS FOR AUTOMATICALLY DELIVERING LIQUIDS TO RECEPTACLES.
(Application filed Mar. 15, 1897.)
(No Model.) 10 Sheets—Sheet 6.

No. 634,424. Patented Oct. 3, 1899.
D. CAMERON & F. J. COMMIN.
APPARATUS FOR AUTOMATICALLY DELIVERING LIQUIDS TO RECEPTACLES.
(Application filed Mar. 15, 1897.)
(No Model.) 10 Sheets—Sheet 7.

No. 634,424. Patented Oct. 3, 1899.
D. CAMERON & F. J. COMMIN.
APPARATUS FOR AUTOMATICALLY DELIVERING LIQUIDS TO RECEPTACLES.
(Application filed Mar. 15, 1897.)

(No Model.) 10 Sheets—Sheet 9.

No. 634,424. Patented Oct. 3, 1899.
D. CAMERON & F. J. COMMIN.
APPARATUS FOR AUTOMATICALLY DELIVERING LIQUIDS TO RECEPTACLES.
(Application filed Mar. 15, 1897.)
(No Model.) 10 Sheets—Sheet 10.
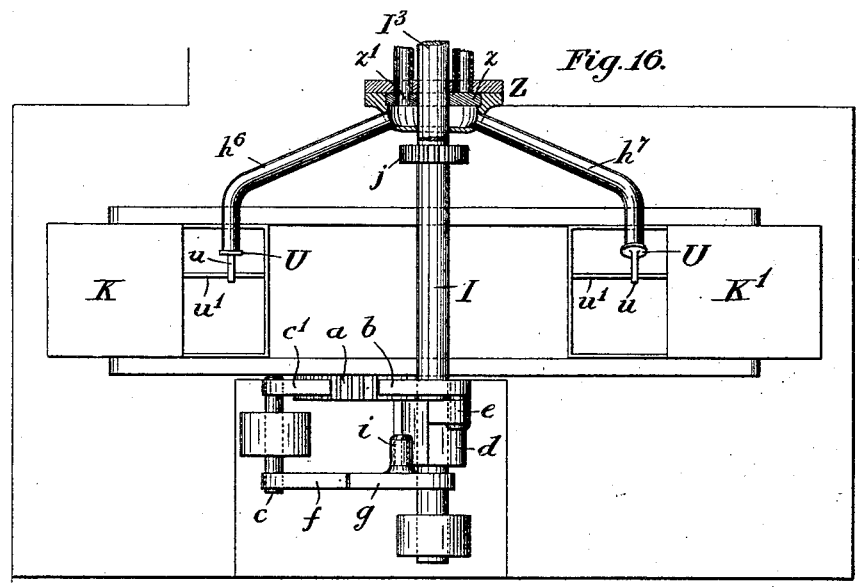
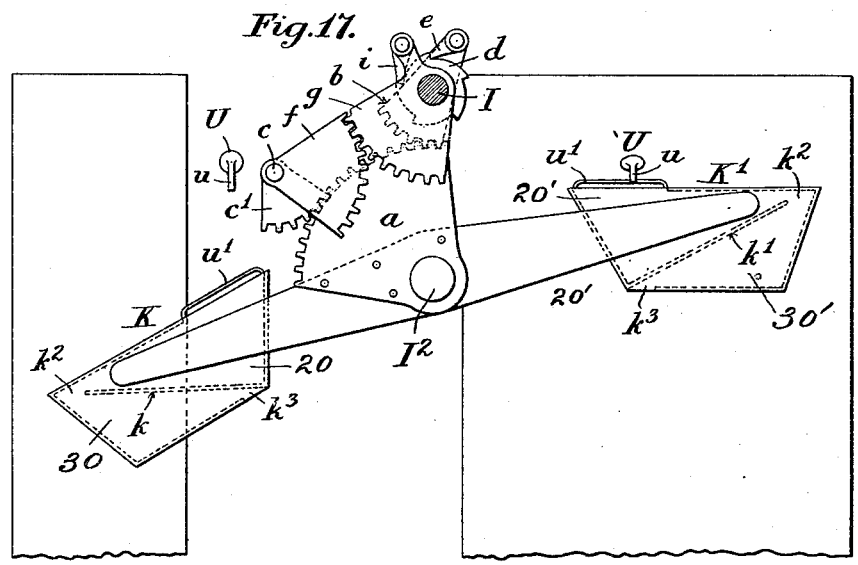

United States Patent Office.

DONALD CAMERON AND FREDERICK J. COMMIN, OF EXETER, ENGLAND.

APPARATUS FOR AUTOMATICALLY DELIVERING LIQUIDS TO RECEPTACLES.

SPECIFICATION forming part of Letters Patent No. 634,424, dated October 3, 1899.

Application filed March 15, 1897. Serial No. 627,548. (No model.)

*To all whom it may concern:*

Be it known that we, DONALD CAMERON and FREDERICK JAMES COMMIN, subjects of the Queen of Great Britain, and residents of Exeter, in the county of Devon, England, have invented certain new and useful Improvements in Apparatus for Automatically Feeding Liquids Successively to Two or More Chambers or Receptacles and Discharging it Therefrom, (for which Letters Patent have been obtained in Great Britain, No. 3,003, dated February 10, 1896; in India, No. 90 of 1897, dated August 13, 1897; in Canada, No. 58,527, dated December 27, 1897; in Cape Colony, No. 1,307, dated March 11, 1897; in Victoria, No. 14,048, dated March 29, 1897; in Queensland, No. 3,823, dated April 1, 1897; in South Australia, No. 3,606, dated April 1, 1897; in New Zealand, No. 9,420, dated April 8, 1897; in New South Wales, No. 7,066, dated November 19, 1896; in France, No. 264,570, dated March 2, 1897; in Belgium, No. 126,675, dated March 2, 1897; in Germany, No. 94,865, dated March 3, 1897; and in Transvaal, No. 1,363, dated March 31, 1897,) of which the following is a specification.

This invention relates to apparatus specially designed for use in the purification of foul water or sewage, but which may also be employed for dealing with other liquids; and it has for its object to provide means for automatically filling and discharging tanks or filters with or without interposing a period of rest between each filling and the next discharge and between each discharge and the next filling; for causing two or more filters to be filled in continuous succession, so that by the intermittent action of each in turn a continuous flow may be dealt with, and for removing a filter or filters from the combination and replacing a filter or filters therein without interfering with the continuous operation of the apparatus.

According to our invention the delivering of liquid to filters or tanks and its discharge therefrom are automatically controlled by suitable apparatus actuated by the overflow of part of the contents of such filter or tank as soon as it is filled to the desired height.

In carrying out our invention the supply and discharge valves for each filter may be operated by an independent set of apparatus or one set may be made to operate the valves of two or more filters. A convenient method is to arrange the filters in pairs and to operate all the valves of each pair by a single set of apparatus.

In order that our invention may be fully understood, we will now proceed to describe the same in connection with the accompanying drawings, in which—

Figure 2:
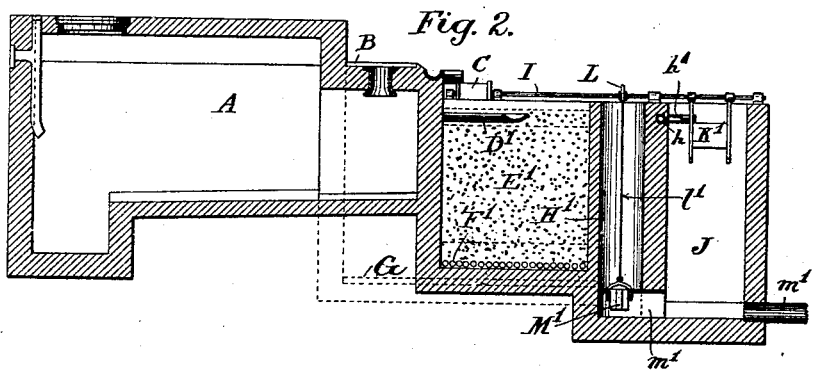
Figure 12:
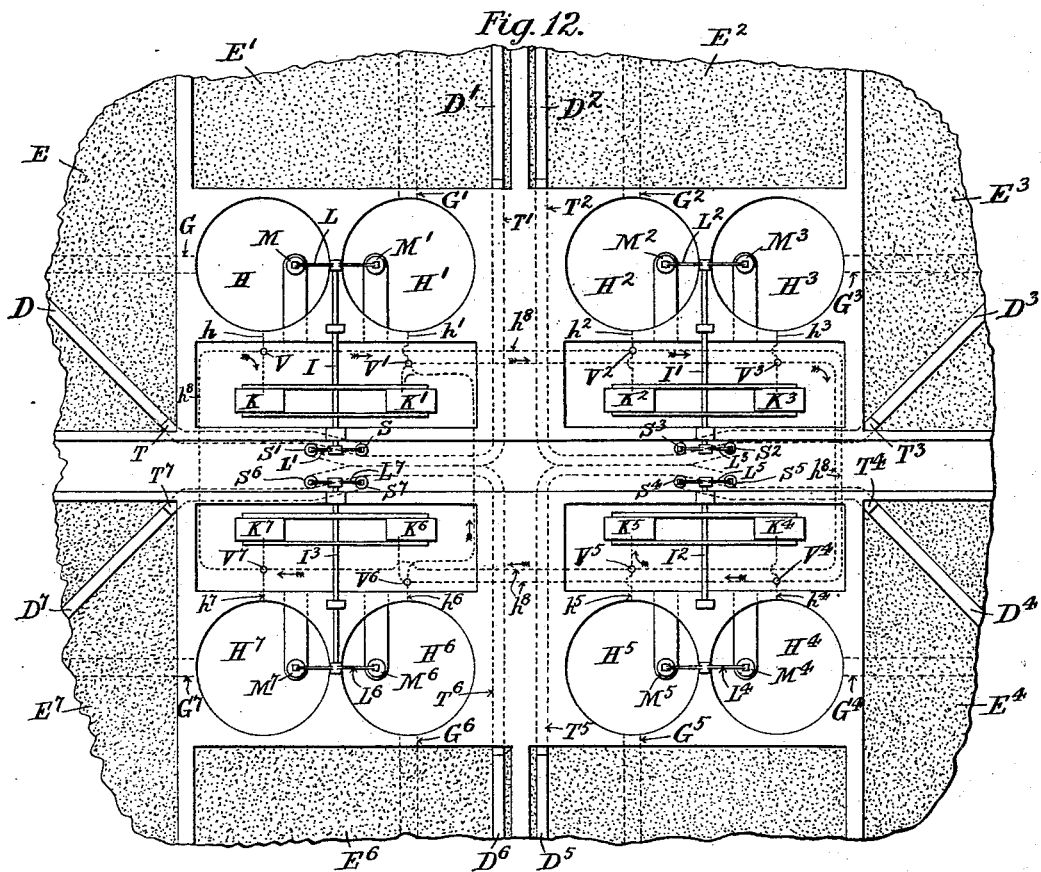
Figure 13:
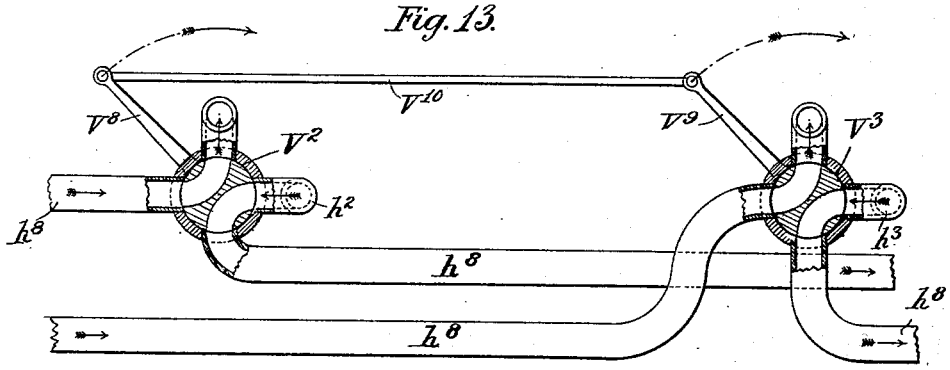
Figure 14:
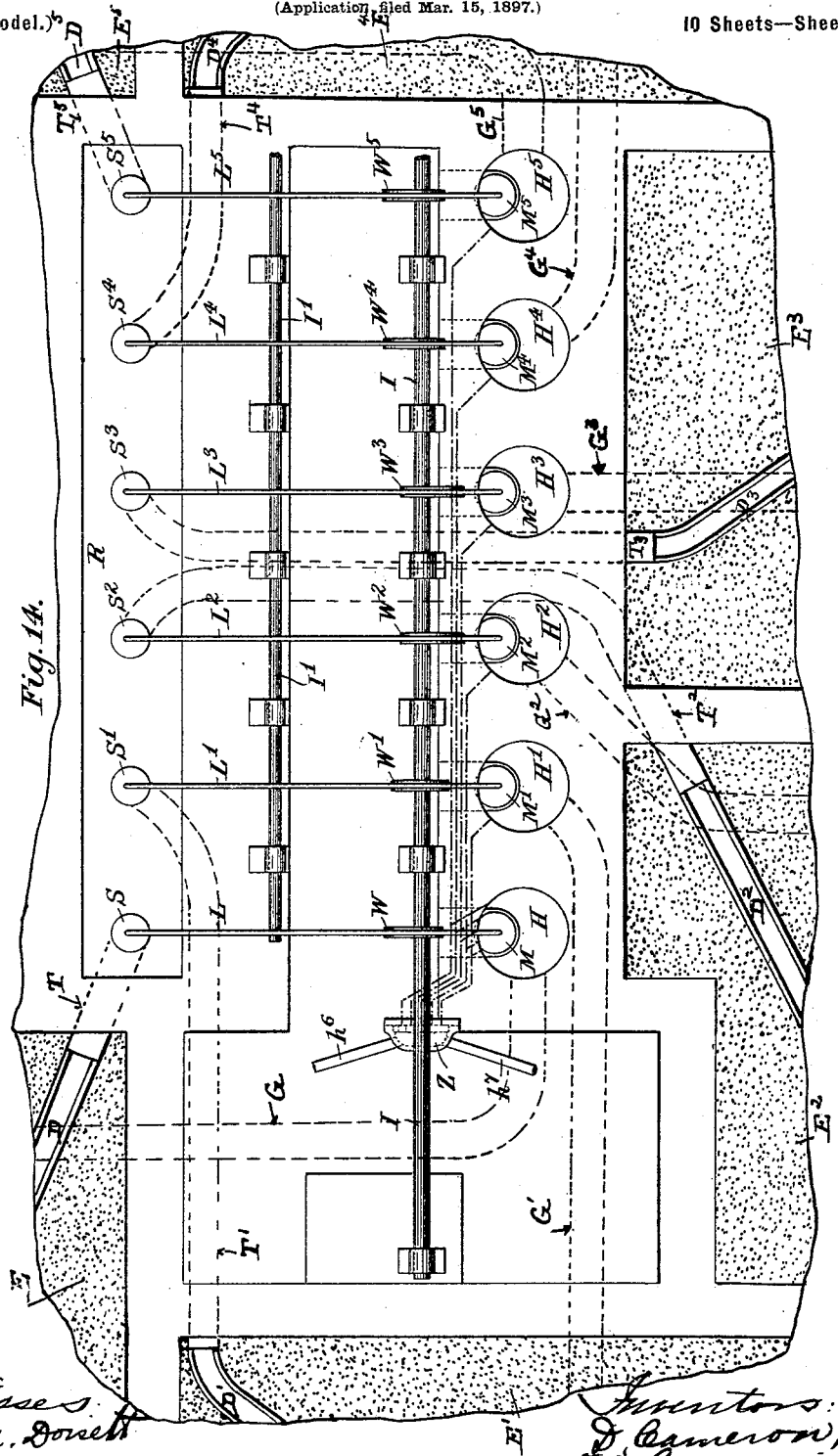
Figure 15:
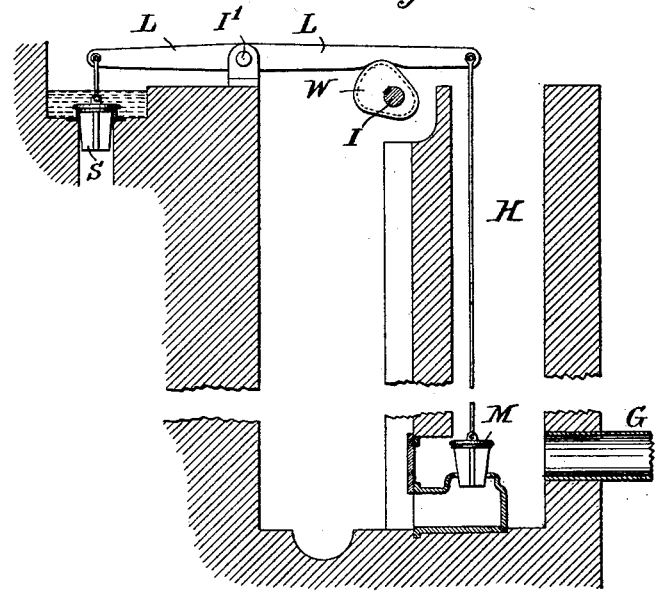
Figure 18:
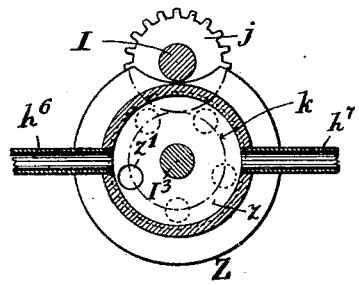

Figure 1 represents a plan view of our improved apparatus. Fig. 2 represents a longitudinal section on the line 2 2, showing one modification of our invention as applied in connection with a septic tank and one pair of filters. Fig. 3 represents a transverse section taken through the filters on the line 3 3 of Fig. 1. Fig. 4 represents a transverse section through the septic tank on the line 4 4 of Fig. 1. Fig. 5 represents a transverse section taken on the line 5 5 of Fig. 1 and showing the buckets for actuating the alternating gear. Fig. 6 represents a plan view on an enlarged scale. Fig. 7 represents a transverse section, drawn on an enlarged scale, showing more clearly the arrangement of the alternating gear. Fig. 8 represents a plan view showing our invention as applied when five filters are employed, one of which is always out of use, so as to enable it to replace one of the other four when for any reason it is required to cut one filter out. Fig. 8ª represents an enlarged sectional view of the dish-aerator used in this arrangement, together with the channels it supplies. Fig. 9 represents a transverse section through one of the wells from which the sewage or sewage-effluent is conveyed to the different filters, the valves being removed from their seatings. Fig. 9ª represents an enlarged sectional view through the collecting-well R', showing one of the distributing-valves disconnected from its operating-lever. Fig. 10 represents a longitudinal sectional view, and Fig. 11 an end view, of one of the flap-valves on the ends of the overflow-pipes which discharge into the buckets for actuating the alternating gear. Fig. 12 represents a plan view showing our invention as applied when eight filters are employed in one set, one or more pairs being capable of being cut out and allowed to rest. Fig. 13 represents a diagrammatic view showing the operation of the four-way cocks used in the arrangement shown in Fig. 12. Fig. 14 is a plan view; and Fig. 15 a transverse section showing a modified form of mechanism for controlling the working of any number of filters by means of a single pair of actuating-buckets, the latter not being shown. Fig. 16 represents an enlarged detail view of this arrangement, showing the buckets; and Fig. 17 represents a front elevation thereof. Fig. 18 represents a vertical sectional view of the valve through which the overflows from the different collecting-wells pass to the actuating-buckets.

In the arrangement for carrying out our invention shown in Figs. 1 to 7, inclusive, and in which only two filters are employed, the sewage or other liquid after passing through the septic tank A flows over a table B onto a diverter C, consisting of a plate or trough or dish so inclined as to throw the oncoming stream into one or other of the channels D D', and according to the position of this diverter it then passes onto either one of the channels D D', from which it is delivered to one or the other of the filters E E', which are filled with any filtering material, such as coke, breeze, or other suitable material. At the bottom of each filter a number of pipes F F' are placed, which conduct the filtrate as it enters them from the filtering material to a culvert or drain G G', Fig. 3, through which such filtrate passes to the collecting-wells H H', Fig. 1. The position of the diverter C, and consequently which of the filters the sewage or other liquid is delivered to, is determined as follows: The shaft I, on which the diverter C is mounted, extends over a chamber J and has a frame attached to it carrying at it opposite extremities buckets K K', which are so arranged that when one of them is depressed in the manner hereinafter described it will not return to its former position until it is again actuated. The bucket K is divided by a partition $k$ into an upper receiving-compartment 20 and a lower delivery-compartment 30, the receiving-compartment 20 being somewhat larger than the delivery-compartment 30. The bucket K' is divided in a similar manner by a partition $k'$ into compartments 20' and 30'. From the collecting-wells H H', preferably near the top of the same, passages or pipes $h\ h'$ are laid, each being so placed that on the liquid in the corresponding collecting-well rising to the level thereof such liquid will pass through the passage $h$ or $h'$ to the bucket at the opposite side of the shaft I, which bucket would then be in its raised position. The effect of the liquid entering the bucket would be that such bucket will descend to its lower position, thereby turning the shaft I, on which, as above stated, the diverter C is mounted, and so causing the sewage or other liquid to be delivered to the other of the two filters E E'. At the same time a double-ended lever L, also mounted on the shaft I and the ends of which are connected by any suitable means, such as rods $l\ l'$, to the discharge-valves M M' at the bottom of the collecting-wells H H', will by this movement of the shaft be caused to open the discharge-valve of the filter which has just been filled and close the discharge-valve of the other, which will then begin to fill. As the bucket which has just been filled descends it will be tilted so that the liquid which occupies the upper compartment 20 of the bucket, formed by the partition $k\ k'$ therein, will flow over the outer edge of such partition, through the opening $k^2$, into the lower compartment 30, where a portion of it will remain to serve as a counterweight, holding the buckets in their new position, the rest overflowing over the inner edge of the bottom of the lower compartment at $k^3$. When the other bucket is in its turn filled with the liquid, it will descend, reversing the position of the buckets, and consequently the positions of the diverter C and the valves M M', raising the valve which was formerly closed and closing the one which was formerly open. As each bucket rises again to its higher position the contents of its lower compartment will be entirely discharged over the inner edge of the bottom of such lower compartment at $k^3$.

The collecting-wells H H', which are connected, respectively, with the bottoms of the filters E E', communicate, through the valves M M', with passages $m\ m'$, through which the effluent can escape when either of such valves is opened. The buckets K K' need not necessarily be hung on shaft I, but may be placed on an independent shaft I by gearing or otherwise, as in Figs. 16 and 17. If more than two filters are used, instead of emptying each filter as soon as it is full it is preferable to retain the filtered water in contact with the filtering material and the oxygen and the micro-organisms therewith engaged. Similarly instead of again filling each filter almost as soon as it is discharged it is preferable to lengthen the period of aeration, so as to better prepare the filter to deal with the next dose of sewage.

In the arrangement shown in Fig. 8 five filters are employed, four only of which are in use at the same time, the fifth being held in reserve, so as to enable it to replace any one of the other four operative ones when required. The liquid from the septic tank or other chamber or receptacle from which it is required to distribute same enters the distributing apparatus at X and passes through a gage-well N and flows along an aerator O, which is of dish form, the liquid falling freely from the edges of such aerator in two thin films into channels P P', from which it is conveyed by pipes $P^2$ to wells R R', provided with distributing-valves S, S', $S^2$, $S^{10}$, $S^{20}$, $S^3$, $S^{30}$, and $S^4$, opening into passages T T' $T^2$ $T^3$ $T^4$, leading to the five filters. Two pairs of buckets K K' $K^2$ $K^3$ are employed, and in addition to the levers L for operating the discharge-valves M M' $M^2$ $M^3$ from the collecting-wells H H' $H^2$ $H^3$ the shafts I I', on which such buckets are mounted, have attached to them levers $L'$ $L^{10}$ $L^2$ $L^{20}$, operating the beforementioned distributing-valves, which take the place of the diverter already described. Any one of the five filters can be cut out and held in reserve, the distributing-valve by which a passage to same is opened being disconnected from its operating-lever, so that it is not operated when the position of such lever is reversed through the movement of one pair of the actuating-buckets. For instance, when it is desired to cut out the filter to which the pipe $T'$ leads the valves $S'$ $S^{10}$, which open into said pipe, are disconnected from the lever $L^2$ and both valves remain seated and stop any flow of liquid into said filter. The pipes $G$ $G'$ $G^2$ $G^3$ $G^4$ conduct the filtrate from the bottom of the filters, respectively, to the collecting-wells $H$ $H'$ $H^2$ $H^3$, the pipe $G$ conducting it to collecting-well $H$ from filter $E$, the pipe $G'$ to collecting-well $H$ or $H'$ from filter $E'$, the pipe $G^2$ to the collecting-well $H'$ or $H^2$ from filter $E^2$, the pipe $G^3$ to the collecting-well $H^2$ or $H^3$ from filter $E^3$, and the pipe $G^4$ to collecting-well $H^3$ from filter $E^4$. Only one pipe leading into each collecting-well is in use at one time, the second pipe leading into each well being closed, as shown, by a valve or plug $g^\times$. Overflow-pipes $h$ $h'$ $h^2$ $h^3$ lead, respectively, from the collecting-wells $H$ $H'$ $H^2$ $H^3$ to the buckets $K^2$ $K^3$ $K'$ $K$, and the end of each of such overflow-pipes is provided with a flap-valve $U$, (shown in detail in Figs. 10 and 11,) having tails $u$, adapted to be operated by the rods $u'$, mounted on the actuating-buckets when the latter rise, thereby opening the passage for the overflow from one of the collecting-wells.

In the arrangement shown in Fig. 8 filters $E$ $E'$ $E^2$ $E^3$ form the working set, filter $E^4$ being held in reserve. Distributing-valve $S$ and the valve $S'$ diagonally opposite to it are connected to the levers on one shaft and valve $S^2$ and the valve $S^3$ diagonally opposite to it are connected to the levers on the other shaft, the remaining four distributing-valves being disconnected and lying on their seats. Filter $E$ is connected through pipe $G$ with well $H$, filter $E'$ through pipe $G'$ with well $H'$, filter $E^2$ through pipe $G^2$ with well $H^2$, and filter $E^3$ through pipe $G^3$ with well $H^3$, the openings from pipe $G'$ into well $H$, $G^2$ into $H'$, $G^3$ into $H^2$, and $G^4$ into $H^3$, respectively, being plugged. Of the distributing-valves which are connected with the levers on the shafts valves $S$ and $S^3$ are open, the other two being closed. Of the discharge-valves $M'$ and $M^2$ are lifted, so that filters $E'$ and $E^2$, having already discharged, may drain freely, and $M$ and $M^3$ are on their seats. Filter $E^3$ is filled and resting, the surface of the water in the filter being at the same level as that in the wells $R$ $R'$, so that no more liquid can enter filter $E^3$; but liquid is passing through well $R'$, valve $S$, and pipe $T$ into filter $E$. As the liquid fills the filter, so the level of the filtered liquid rises in well $H$, and when filter $E$ is filled to the desired level, a part of the contents of well $H$ will escape through overflow-pipe $h$ into bucket $K^2$. As soon as the weight of water in bucket $K^2$ overcomes the pressure of water on valve $M^3$ bucket $K^2$ will descend, rocking shaft $I$ and the levers therewith connected, lifting valve $M^3$, so that the contents of well $H^3$ and filter $E^3$ may escape, closing valve $S^3$, so that no more liquid may pass into filter $E^3$, closing valve $M^2$, and opening valve $S^2$ to supply liquid through pipe $T^2$ to filter $E^2$, which will next be filled, filter $E$ resting full meanwhile. As soon as filter $E^2$ is full a part of the contents of well $H^2$ will overflow through passage $h^2$ into bucket $K'$. The contents of filter $E$ will then be discharged and filter $E'$ will then be filled. Similarly the filling of filter $E'$ will cause filter $E^2$ to be emptied and filter $E^3$ to be filled, and the filling of filter $E^3$ will cause filter $E'$ to be emptied and filter $E$ to be filled, as before. It will be seen that at certain times two filters will be full, but that one only will overflow which has a bucket in the raised position ready to receive its overflow, the overflow of the other well being prevented by the valve $U$ on its overflow-pipe.

Figs. 12 and 13 illustrate an arrangement for working any number of pairs of filters in one set, (four pairs of filters being shown in Fig. 12,) any pair of such filters being capable of being thrown out of operation by means of the employment of cocks in the overflow-pipes. In this arrangement the overflows $h$ $h'$ $h^2$ $h^3$ $h^4$ $h^5$ $h^6$ $h^7$ from all the filters are brought into one continuous pipe $h^8$, forming two complete rings, of which one receives the overflows of the filters $E$, $E^2$, $E^4$, and $E^6$ and the other those of the filters $E'$, $E^3$, $E^5$, and $E^7$. Branches from the same pipe deliver the overflow liquid to the actuating-buckets $K$ $K'$ $K^2$ $K^3$ $K^4$ $K^5$ $K^6$ $K^7$. The direction of the overflow from each filter is governed by valves or cocks or preferably by one four-way cock $V$ $V'$ $V^2$ $V^3$ $V^4$ $V^5$ $V^6$ $V^7$, (the arrangement for each pair of filters being shown in Fig. 13,) such cocks being placed in the continuous pipe at the junction of the overflow-pipe from each filter. The delivery-pipes to the actuating-buckets branch off at the same points. With the cocks in the position shown in Fig. 13 the two filters $E^2$ and $E^3$, controlled by such cocks, will be in use. Their actuating-buckets are filled by the overflow from filters $E$ and $E'$ and their overflows go to the buckets of filters $E^4$ and $E^5$, respectively. By throwing the levers $V^8$ and $V^9$ of the stop-cocks $V^2$ and $V^3$ of such filters $E^2$ and $E^3$ over a quarter of a turn to the right by hand such filters $E^2$ and $E^3$ will be cut out, and filter $E$ will then overflow into the bucket of filter $E^4$ and filter $E'$ into the bucket of filter $E^5$. It will be seen that the levers $V^8$ and $V^9$ of the stop-cocks $V^2$ and $V^3$ are connected together by a rod $V^{10}$, so that the two cocks are operated together. The working of this arrangement is in all respects similar to that of the arrangement shown in Fig. 8. If filters E E' E² E³ E⁴ E⁵ form the working set, filters E⁶ and E⁷ being in reserve, when filter E fills a small part of the contents of well H will overflow through pipe $h$, four-way cock V, pipe $h^8$, and four-way cock V² into bucket K², discharging the contents of filter E³ and causing filter E² to be filled. Similarly when E² is filled filter E⁵ will be discharged and E⁴ caused to fill, and when E⁴ is filled filter E will be discharged and filter E' caused to fill. Where it is desired to operate the valves of each filter independently, the actuating-gear will be in all respects similar to that above described; but one set will be provided for each filter and will operate the valves belonging to that filter only. In this case the overflow-pipe from each filter will be in duplicate or will be branched, one branch delivering to the actuating-gear of the filter it is desired to fill and the other to that of the filter it is desired to empty.

As an alternative to the arrangement already described all the valves admitting liquid to the filters, or all the discharge-valves, or all the admission-valves and all the discharge-valves may be connected by cams, cranks, eccentrics, or otherwise to one shaft. Each connection may have a certain amount of play or lost motion, so that the valve connected may not move with every part of a revolution of the shaft, but only at certain stages of each revolution. This arrangement is illustrated in Figs. 14 to 18, inclusive, wherein, as will be seen, a single pair of actuating-buckets is employed for controlling the supply to and discharge from any desired number of filters, (the drawings showing the application of such arrangement to six filters, one of which is always cut out, so as to enable it to be used to replace one of the five which are operative when desired,) the alternate reciprocating movement imparted to the shaft carrying such pair of buckets being converted into an intermittent rotary movement always in the same direction, which is employed to control the supply and discharge valves of the operative filters. In this arrangement the channel or tank R, leading from the chamber or receptacle from which the liquid is to be distributed, is common to all the distributing-valves S S' S² S³ S⁴ S⁵, controlling the passages T, T', T², T³, T⁴, and T⁵ to the respective filters, each of such valves S S' S² S³ S⁴ S⁵ being mounted on one end of a lever L L' L² L³ L⁴ L⁵, each of which levers is pivoted on a shaft I', on which each lever is free to move independently, and the other ends of which levers L L' L² L³ L⁴ L⁵ are connected to the discharge-valves M M' M² M³ M⁴ M⁵ of the collecting-wells H H' H² H³ H⁴ H⁵, communicating with the six filters E E' E² E³ E⁴ E⁵ through pipes G G' G² G³ G⁴ G⁵. The overflow-pipes from the collecting-wells H H' H² H³ H⁴ H⁵, as shown in broken lines in Fig. 14, all lead to a common controlling-valve Z, from the case of which two overflow-pipes $h^6$ and $h^7$ lead to and terminate, respectively, over the actuating-buckets K K', Fig. 16, the end of each of same being provided with a flap-valve U, as previously described in connection with the arrangement shown in Figs. 8 and 9. The shaft I², carrying the buckets K K', has mounted upon it a toothed sector $a$, gearing with the teeth of a sector $b$, mounted loosely on the main shaft I. (See Figs. 16 and 17.) The sector $a$ also gears with the teeth of another sector $c'$, mounted on a shaft $c$ and carrying another toothed sector $f$, gearing with a toothed sector $g$, also mounted loosely on the shaft I. Keyed to the shaft I is a ratchet-wheel $d$, and gearing with the teeth of same are pawls $e$ and $i$, carried, respectively, by the toothed sectors $b$ and $g$, mounted loosely on such shaft I.

The operation is as follows: Upon either of the buckets K or K' being filled by the overflow from one of the filters, and consequently caused to descend, the sector $a$, carried by the shaft I², will by gearing with the sector $b$, mounted loosely on the main shaft I, operate same and by gearing with the sector $c'$ on the shaft $c$ also operate this, and through sector $f$, mounted on the latter shaft, such movement will be transmitted to the sector $g$, also mounted loosely on the main shaft I. It will thus be seen that assuming the parts to be in the position shown in Fig. 17 if the bucket K' is filled, and consequently caused to descend, the sector $a$ on shaft I will, through the pawl $e$, carried by the sector $b$ and gearing with the teeth of ratchet $d$, move the shaft I forward, while at the same time such sector $a$, through sector $c'$, sector $f$, and sector $g$, will cause the pawl $i$, carried by the latter, to slip backward over the teeth of such ratchet $d$. If, on the other hand, the bucket K, being in the raised position, is filled and caused to descend, the movement imparted to the toothed sector $a$ will cause pawl $i$ to propel shaft I forward in the same direction as before, while the pawl $e$ will slip back over the teeth of the ratchet $d$. It will thus be seen that the rocking movement imparted to shaft I² by the alternate filling of the buckets K K' will transmit an intermittent movement always in the same direction to shaft I. Such shaft I has mounted upon it a series of cams W W' W² W³ W⁴ W⁵, (see Figs. 14 and 15,) so arranged as to operate the levers L L' L² L³ L⁴ L⁵, controlling the valves S S' S² S³ S⁴ S⁵ for distributing the liquid to the different filters and also the valves M M' M² M³ M⁴ M⁵ for controlling the discharge of the effluent therefrom. It will be seen that supposing filter E to be held in reserve the valves and connections of the other filters may be so arranged that while filter E' is filling filter E⁵ may be resting full, filter E⁴ emptying, and filters E² and E³ resting empty. Assuming this to be the case, on the buckets being actuated by the filling of filter E' the discharge-valve M⁵ of filter E⁵ will be opened, thus allowing this filter to empty. Filters E³ and E⁴ will be allowed to rest empty and the valve S², controlling the supply to filter E² through pipe T² and channel D², will be opened, so that this filter will be filled, valve M² being at the same time shut down, filter E' resting full until the buckets are again actuated, when it in turn will be discharged, and so on.

The controlling-valve Z, with which the overflow-pipes from the different filters all communicate, consists of a disk $z$, having a single aperture $z'$, and which by a toothed wheel $j$, mounted on the main shaft I and gearing with a wheel $k$, mounted on the shaft I³ of disk $z$, is on each movement of the shaft I caused to make one-fifth of a revolution and thereby bring its aperture opposite the opening of each of the overflow-pipes in succession, and thus enable such liquid to pass through one or other of the pipes $h^6$ or $h^7$, according to which bucket K or K' is in the raised position. As before stated, the end of each of the pipes $h^6$ and $h^7$ is fitted with a flap-valve U, so that it is only that which is opened in consequence of the bucket over which it is situated being raised that the liquid can pass through, and consequently such bucket will be filled and the alternating gear actuated in the manner described. The overflow from the spare filter E can be connected by means of a three-way cock or in any suitable manner with the overflows from the five operative filters, so as to enable it to replace any one of the same. The lever controlling the valves of the filter out of use may be supported so as not to be actuated by the cam on the main shaft, which is provided to operate same when required.

We claim as our invention—

1. The combination of a plurality of receptacles, and automatic means actuated by the overflow from said receptacles for controlling the supply and discharge thereof.

2. The combination of a plurality of receptacles, means for supplying liquid to said receptacles successively, valves for the discharge of such liquid, buckets adapted to operate said supply means and discharge-valves, and overflow pipes or passages through which liquid from said receptacles may pass and fill said buckets in turn.

3. The combination of three or more receptacles, supply and discharge mechanism for said receptacles, automatic means actuated by the overflow from said receptacles for controlling the supply and discharge thereof, and means for cutting out of or introducing into operation one of said receptacles without interfering with the operation of the apparatus.

4. The combination of a plurality of receptacles, a rock-shaft, a frame mounted on said shaft, buckets supported on said frame on opposite sides of said shaft, pipes for conveying the overflow from said receptacles to said buckets alternately, said overflow causing the buckets to rise and fall alternately for rocking the shaft in opposite directions, and means connected with said shaft for controlling the supply and discharge of the liquid to and from said receptacles.

5. The combination of a plurality of receptacles, overflow pipes or passages leading therefrom, valves disposed in said pipes, and actuating-buckets adapted to open and close said valves successively.

6. The combination of three or more receptacles, supply and discharge mechanism for said receptacles, means for controlling said supply and discharge mechanism actuated by the overflow from said receptacles, and four-way cocks disposed in the overflow-passages from said receptacles whereby one or more of said receptacles may be thrown out of operation at will.

7. The combination of a plurality of receptacles, overflow pipes or passages leading therefrom, flap-valves disposed on said pipes, and actuating bucket mechanism adapted to open and close said valves.

8. The combination of a plurality of receptacles, overflow pipes or passages leading therefrom, flap-valves disposed on said overflow-pipes, and provided with projections, and actuating means adapted to engage said projections and open said valves.

9. In an apparatus for automatically delivering liquid successively to a plurality of receptacles and discharging it therefrom, the combination of a rock-shaft, a frame mounted thereon, buckets supported on said frame on opposite sides of said shaft, into which the overflow from said receptacles is alternately delivered, thereby imparting movement to said shaft, discharge means for said receptacles operated successively by said shaft, and a diverter disposed on said shaft and adapted to deliver liquid alternately to said receptacles.

10. The combination of two tanks or filters, a diverter for supplying liquid to each of said filters in turn, discharge-valves for said liquid, a pair of buckets operating said diverter and discharge-valves, and overflow pipes or passages by which liquid from said tanks or filters when filled to the desired height may fill said buckets in turn.

11. The combination of two or more tanks or filters, valves for delivering liquid to said filters successively, valves for discharging it therefrom, a pair or pairs of buckets operating said valves, and overflow pipes or passages by which liquid from said tanks or filters when filled to the desired height may fill said buckets in turn.

12. The combination of three or more tanks or filters, some of which only are in use at one time, apparatus for alternately filling and emptying the tanks or filters in use, pipes or passages whereby the tank or tanks or filter or filters not in use may be filled and discharged by the same set of apparatus, and means for closing said pipes or passages.

13. The combination of three or more tanks or filters, apparatus for filling and emptying said tanks or filters in succession, overflow pipes or passages for conveying liquid for working said apparatus, and valves or cocks by which one or more of said tanks or filters may be cut out of or thrown in without interfering with the operation of the tanks or filters remaining in use.

14. The combination with a moving bucket, of a counterweight to hold such bucket in a desired position, said counterweight consisting of a second chamber having an opening whereby water may pass into it from the actuating-bucket when the latter falls, and a second opening whereby said second chamber may be emptied when the bucket rises.

15. The combination of overflow-pipes from several chambers or receptacles with a disk valve and flap-valves, in such a manner as to direct the discharge of the overflow from any one of a number of receptacles or chambers into the actuating-bucket which should next receive it.

16. In combination with three or more tanks or filters of which some only are in use at one time, pipes or passages whereby the tanks or filters in use may be filled or discharged, valves for closing said pipes or passages, a pair of buckets for opening and closing said valves, the motion of said buckets being communicated to said valves through gearing and a shaft or shafts, pipes or passages for conveying the overflow from said tanks or filters into said buckets, and valves for directing said overflow into the bucket which should receive it, and means for disconnecting the valves belonging to any tank or filter so as to throw said tank or filter out of use.

17. The combination of a plurality of filters, wells for collecting the filtrate from said filters, pipes connecting said filters with said collecting-wells, discharge-valves disposed in said collecting-wells, said wells being provided with overflow-pipes, and means operated by the overflow from said wells for opening and closing said discharge-valves.

18. The combination of a plurality of filters, means for supplying liquid to said filters successively, wells for collecting the filtrate from said filters, pipes connecting said filters with said collecting-wells, said wells being provided with discharge-valves disposed in the bottom thereof, and with overflow-pipes near the top thereof, and means operated by the overflow from said wells for actuating the filter-supplying means and the discharge-valves of the collecting-wells.

19. The combination of a plurality of filters, means for supplying liquid to said filters successively, wells for collecting the filtrate from said filters, pipes connecting said filters with said collecting-wells, said wells being provided with discharge-valves disposed in the bottom thereof, and with overflow-pipes near the top thereof, and distributing-pipes connected with the discharge-valves of said collecting-wells, means operated by the overflow from said wells for actuating the filter-supply means and the discharge-valves of the collecting-wells.

20. The combination of a plurality of filters, collecting-wells connected therewith, a shaft extending over said filters and wells, a diverter disposed on said shaft over said filters and adapted to direct the flow of liquid to said filters alternately, and buckets disposed on opposite sides of said shaft for actuating the diverter.

21. The combination of a plurality of filters, wells connected therewith for collecting the filtrate therefrom, said wells being provided with discharge-valves, a shaft extending over said filters and wells, mechanism connecting said discharge-valves with said shaft, a diverter disposed over said filters on said shaft and adapted to direct the flow of liquid to said filters alternately, and buckets suspended on said shaft for actuating the diverter and the discharge-valves of the collecting-wells.

22. The combination of a plurality of filters, wells connected therewith for collecting the filtrate therefrom, said wells being provided with discharge-valves, a shaft extending over said filters and wells, mechanism connecting said discharge-valves with said shaft, a diverter disposed over said filters on said shaft, and adapted to direct the flow of liquid to said filters alternately, and buckets suspended on said shaft for actuating the diverter and the discharge-valves of the collecting-wells, said collecting-wells being provided with overflow pipes or passages through which liquid from said wells when filled to the desired height may pass and fill said buckets in turn causing them to rise and fall alternately.

23. The combination of a plurality of filters, wells connected therewith for collecting the filtrate therefrom, said wells being provided with discharge-valves, a shaft extending over said filters and wells, mechanism connecting said discharge-valves with said shaft, a diverter disposed over said filters on said shaft, and adapted to direct the flow of liquid to said filters alternately, buckets suspended on said shaft for actuating the diverter and the discharge-valves of the collecting-wells, said collecting-wells being provided with overflow pipes or passages through which liquid from said wells when filled to the desired height may pass and fill said buckets in turn causing them to rise and fall alternately, said overflow-pipes crossing each other and discharging into the buckets disposed diagonally opposite to the well from which said pipes lead, thereby causing the shaft to turn together with the mechanism disposed thereon whereby the filled receptacle is emptied and another filled.

24. The combination of a plurality of filters, collecting-wells connected therewith and provided with discharge-valves and overflow-pipes, a shaft extending over said filters and wells, a diverter disposed on said shaft over said filters, a frame attached to said shaft, and buckets supported at opposite sides thereof and adapted to be operated by the overflow from said wells.

25. The combination of a plurality of filters, collecting-wells connected therewith and provided with discharge-valves and overflow-pipes, a shaft extending over said filters and wells, a diverter disposed on said shaft over said filters, a frame attached to said shaft and buckets disposed at opposite ends thereof and adapted to be operated by the overflow from said wells, a double end lever also mounted on said shaft, and means for connecting the ends of said lever to the discharge-valves of the collecting-wells.

26. The combination of a plurality of filters, collecting-wells connected therewith and provided with discharge-valves and overflow-pipes, a shaft extending over said filters and wells, a diverter disposed on said shaft over said filters, a frame attached to said shaft, buckets disposed at opposite ends thereof and adapted to be operated by the overflow from said wells, and a counterweight for each bucket adapted to overbalance the weight of the apparatus and hold it out of central position during the filling of the other bucket.

27. The combination of a plurality of receptacles, supply and discharge mechanism for said receptacles, a pair of buckets adapted to control said supply and discharge mechanism, said buckets being adapted to rise and fall alternately, and means for holding one of said buckets in lowered position until it is again actuated.

28. A pair of buckets actuated by the overflow from a plurality of receptacles and adapted to control the supply and discharge therefrom, each bucket comprising two chambers adapted to be filled alternately, one of said filled chambers serving as a counterweight for holding the bucket in lowered position.

29. The combination of a tilting frame, and two buckets rigidly supported thereby, each bucket having primary and secondary chambers in communication, the primary chamber being adapted to receive a quantity of liquid sufficient to tilt the frame and cause the bucket to descend, and the secondary chamber being adapted to receive liquid from the primary chamber on descent of the bucket for holding it in lowered position.

30. A bucket having a partition forming two chambers one above the other, the upper chamber being adapted to hold liquid when the bucket is in horizontal position, and the lower chamber being adapted to receive liquid from the upper chamber when the bucket is in inclined position and discharge it when the bucket is in horizontal position.

31. A counterbalancing bucket having a diagonal partition forming two chambers disposed one above the other and in communication near the top of the bucket, the upper chamber having an inlet at the top of the bucket and the lower chamber having an outlet at the bottom of the bucket.

32. The combination of three or more filters, each having a supply-valve and a discharge-valve connected to a single lever, and means for moving said levers in succession thereby closing one valve and opening another.

33. The combination of three or more filters, each having a supply and a discharge valve connected to a single lever, and cams for communicating motion to said levers in succession.

34. The combination of three or more filters, each having a supply-valve and a discharge-valve connected to a single lever, and a moving mechanism the motion of which is communicated to each of said levers during a certain part of said motion, said lever remaining at rest during the remaining part of said motion.

DONALD CAMERON.
FRED. J. COMMIN.

Witnesses:
ALBERT ZELLEY,
ALEX. G. MATTHEWS.